Aug. 9, 1949.   E. A. FARR ET AL   2,478,529
ELECTRIC GRILL
Filed Jan. 26, 1946   2 Sheets-Sheet 1
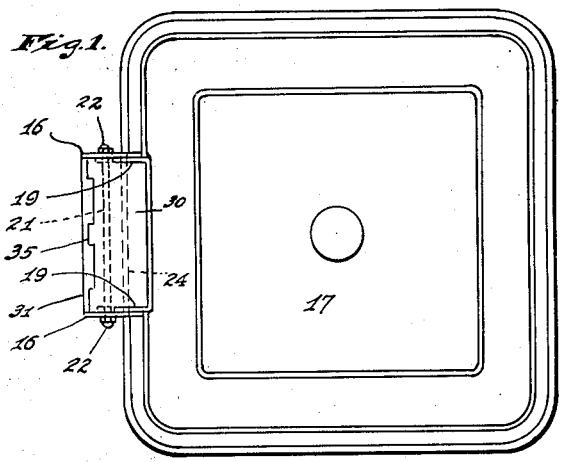
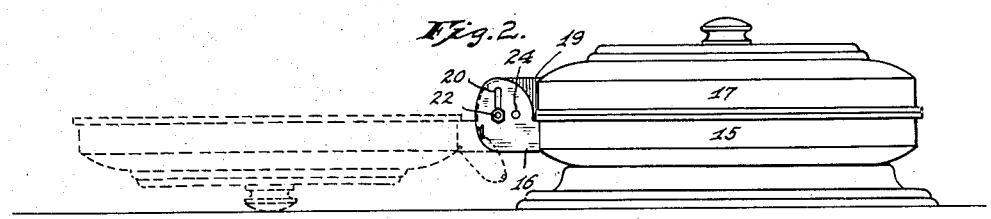
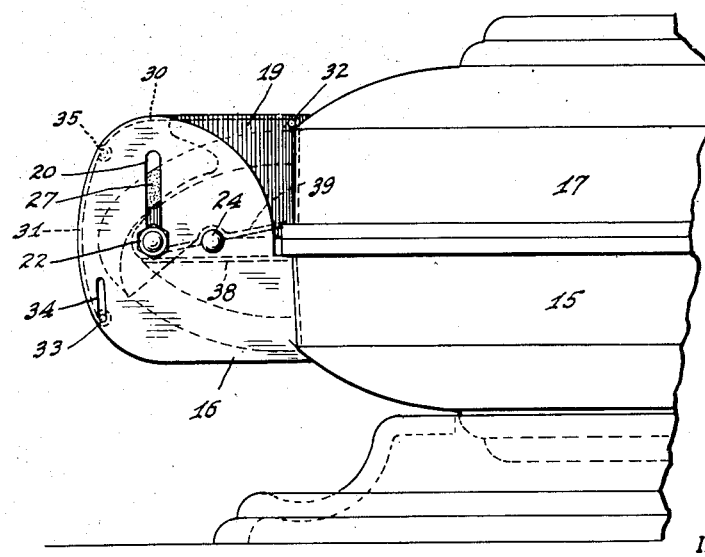
INVENTORS.
EDWARD A. FARR and
JOHN P. THEISEN,
BY
ATTORNEYS.

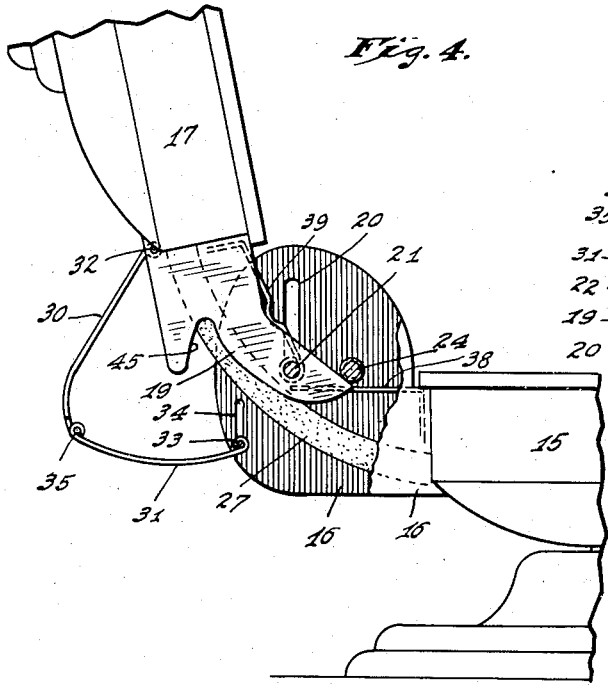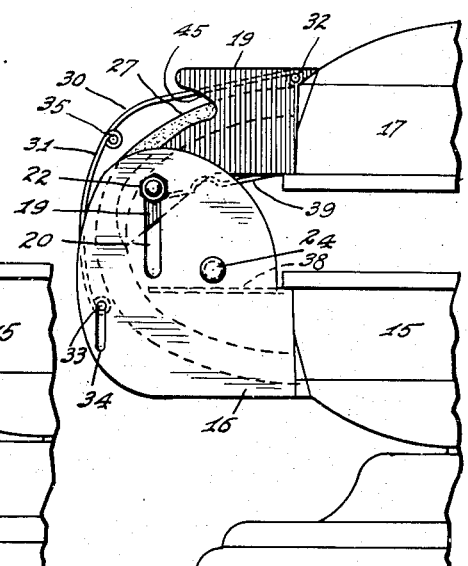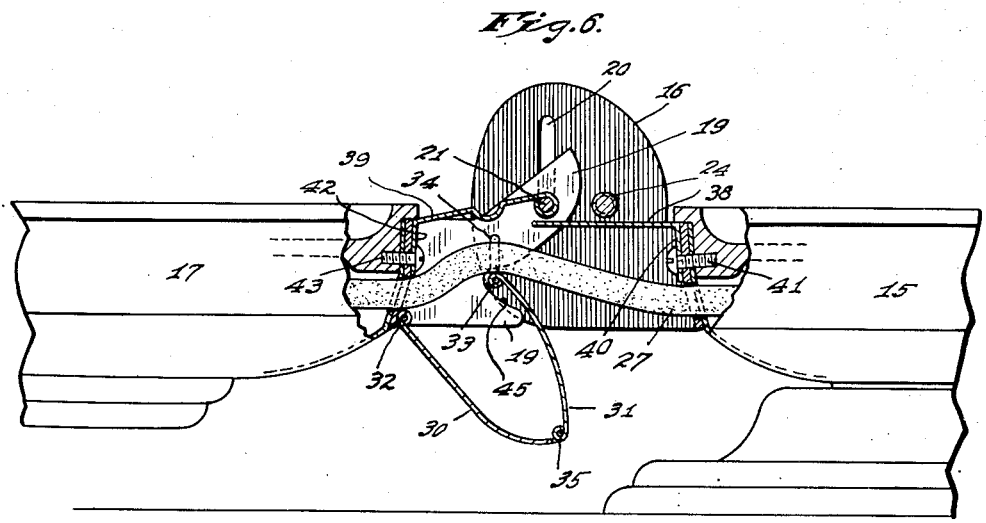

Patented Aug. 9, 1949

2,478,529

UNITED STATES PATENT OFFICE 2,478,529

ELECTRIC GRILL

Edward A. Farr and John P. Theisen, Columbus, Ind., assignors to Noblitt-Sparks Industries, Inc., Columbus, Ind., a corporation of Indiana Application January 26, 1946, Serial No. 643,582

7 Claims. (Cl. 219—19)

Our invention relates to a cooking appliance, such as a waffle iron or broiler, containing relatively movable upper and lower interconnected sections each containing an electrical resistance heating unit. In such devices, current is ordinarily supplied to the heating unit of the upper section by an exposed flexible cable containing electrical conductors, such cable extending between the upper and lower sections of the appliance.

It is the object of our invention to provide a cooking appliance of the type mentioned with means for enclosing and protecting the cable by which current is supplied to the heating unit in the upper section. Another object of our invention is to provide a cable-protecting means which will not interfere with the desired relative movement of the two sections of the appliance. Still another object of our invention is to improve the appearance of a cooking appliance of the type referred to.

In carrying out our invention we provide each of the upper and lower sections of the appliance with a pair of ears one pair of which is received within the other. A pivot bolt extending through openings in one pair of ears is received in vertical slots in the other pair, whereby the two sections are interconnected for both relative swinging and relative vertical movement. Extending between the ears we provide a pair of pivotally interconnected shields one of which is pivotally connected to the upper section of the appliance and is adapted to extend rearwardly therefrom and the other of which is connected to the ears of the lower section for both pivotal and vertical movement relatively thereto. The cable which interconnects the heating units of the two sections extends around the pivot bolt and is enclosed by the two shields which both protect and conceal it.

The accompanying drawings illustrate our invention. Figs. 1 and 2 are a plan and a side elevation respectively of a cooking appliance, such as a waffle iron or broiler; Fig. 3 is a fragmental elevation on an enlarged scale of the cooking appliance; and Figs. 4, 5, and 6 are views similar to Fig. 3 illustrating other positions of the upper section, portions of the device being broken away in Figs. 4 and 6.

The appliance shown in the drawing has a lower section provided with a housing 15 having two spaced, rearwardly projecting, vertical ears 16 rigid with it. The upper section has a housing 17 likewise provided with two rearwardly projecting ears 19 adapted to be received between the ears 16 of the lower section. The ears 16 are provided with vertical slots 20 and the ears 19 with holes through which there extends a pivot bolt 21. Conveniently, the ends of the pivot bolt project beyond the ends of the outer ears 16 and are screwthreaded for reception in acorn nuts 22. At least one of the ears 19 of the upper section projects rearwardly beyond the pivot bolt 21 into position to engage a stop pin 24, secured to the adjacent ear 16, when the upper section of the appliance is swung upwardly through and beyond a vertical position about the axis of the bolt 21 when such bolt is at the lower ends of the slots 20. This condition is illustrated in Fig. 4, from which it will be apparent that with the pivot bolt 21 at the lower ends of the slots 20 and with the ear 19 in engagement with the stop pin 24 the upper section of the appliance will be in such a position that the force of gravity tends to rotate it in a counter-clockwise direction about the axis of the pivot bolt 21. Such rotation is limited by engagement of the ear 19 with the pin 24.

The rearwardly projecting portion of the ear 19 which engages the pin 24 to limit opening movement of the upper section 17 is short enough so that it can be lifted clear of such pin by elevation of the upper section 17 accompanied by upward movement of the bolt 21 in the slots 20. By thus freeing the ear 19 from engagement with the stop pin 24, the upper section can be swung in a counter-clockwise direction into the horizontal position illustrated in Fig. 6, in which it rests on the same supporting surface as does the lower section 15.

Each section of the appliance is provided with an electrical resistance heating unit (not shown), and the heating unit is supplied with current through a flexible cable 27 containing electric conductors. The cable 27 extends outwardly through an opening in the casing 15 between the ears 16 and thence around the pivot bolt 21 and into an opening in the casing 17 between the ears 19.

As so far described, the device is not new. The invention forming the subject matter of this application relates to means for closing the space between the ears 19 and for thus protecting and concealing the cable 27. The enclosing means comprises an upper sheet-metal shield 30 and a lower sheet-metal shield 31. The upper shield 30 is pivotally connected to the casing 17 as by having one of its longitudinal edges rolled to form a bead embracing a pivot pin 32 which extends between the ears 19 close to their junctions with the casing 17. The lower shield 31 is connected to the ears 19, again conveniently by having one of its longitudinal edges rolled into a bead which embraces a pin 33 the ends of which project beyond the bead and are slidably received in vertical slots 34 near the rear edges of the ears 16. Those edges of the shields 30 and 31 which are not connected respectively to the casing 15 and 17 are pivotally interconnected. Conveniently such interconnection is effected by providing the shields with tongues rolled to form interfitting beads which receive a common pivot pin 35 to constitute a piano-type hinge.

The two shields 30 and 31 are so arranged as to enclose substantially completely the upper and rear sides of the space between the ears 16 and 19. In the arrangement shown, the ears 16 and 19 project upwardly to an elevation substantially that of the pivot pin 32 by which the shield 30 is pivotally connected to the ears 19, the front edges of the ears 16 being substantially concentric with the bottom of the slots 20 so as not to interfere with opening movement of the upper section 17. The ears 19 extend rearwardly from the upper section 17 to close the spaces between the section 17 and the front edges of the ears 16 and to overlap slightly the front edges of the ears 16. The upper edge of each ear 19 extends substantially horizontally from the casing 17 to a point adjacent the top of the associated ear 16. The rear edge of each ear 16 is preferably curved, lying within the arc described by the lower edge of the upper section of the appliance as such upper section swings into the horizontal position illustrated in Fig. 6.

The upper shield 30 extends rearwardly from the casing 17 and continues on for a distance around the curved rear edges of the ears 16, its outer surface being substantially flush with the edges of the ears 19 and 16. The lower shield 31 extends from the pivot pin 35 downwardly to the pivot pin 33 along the rear edges of the ears 16, its outer surface being desirably flush with such ear-edges when the cooking appliance is closed.

To protect and conceal the cable 27 when the device is open, I employ guards 38 and 39 associated respectively with the lower and upper sections of the cooking appliance. The guard 38 extends rearwardly from the casing 15 to a point below the pivot bolt 21, conveniently being mounted on the casing 15 through an integral flange 40 secured to the casing as by a screw 41. The guard 39 extends from the rear edge of the upper casing 17 into association with the pivot bolt 21, its free edge being conveniently formed to provide a bead embracing such pivot bolt, as will be clear from Fig. 6. The guard 39 may be attached to the casing 17 through a flange 42 and screws 43 such as are used for attachment of the guard 39.

When the cooking appliance is closed, the upper section thereof rests on the lower section, and the pivot bolt 22 is at or near the bottom of the slots 27 in the ears 16. The pivot pin 33 is supported by the bottom ends of the slots 34 in the ears 16 and in turn supports the outer end of the shield 30 so that it will be substantially flush with the upper edges of the ears 19. If the appliance is to be opened to the position illustrated in Fig. 4, its free edge is lifted upwardly and swing rearwardly until the ears 19 engage the stop pins 24, the pivot bolt 21 remaining at the bottom ends of the slots 20 under the influence of gravity. The pivot pin 33 remains at the lower ends of the slots 34, the shields 30 and 31 moving freely into the position shown in Fig. 4.

If both the upper and lower sections of the appliance are used in the cooking operation, and if the article being cooked is of sufficient thickness, the upper and lower sections will occupy the parallel, spaced position illustrated in Fig. 5, the pivot pin 22 being elevated in the slots 20. In the elevation of the upper section of the appliance, the shield 30 may swing in a counter-clockwise direction about the pivot pin 32 until its movement is limited, as by engagement with the cable 27; and any further elevation of the upper section of the appliance will then cause the pivot pin 33 to move upwardly in the slots 34. Because the upper shield 30 may drop downwardly, or swing in a counter-clockwise direction about the pin 32, from the position shown in Fig. 3, the slots 34 need not be as long as the slots 20.

When the appliance is to be fully opened, or put in the position illustrated in Fig. 6, the upper section, is elevated to raise the pivot bolt 21 in the slots 20, thus permitting the outer ends of the ears 19 to clear the stop pins 24. In this operation, the shields 30 and 31 swing into the position illustrated in Fig. 6. It will be noted from Fig. 6 that the rear ends of the ears 19 have swung into positions in which they extend beneath and beyond the pin 33 through which the shield 31 is connected to the ears 16. As the shield 31 is desirably long enough to extend between the ears 16, and therefore long enough to extend past the ears 19, the ears 19 are relieved or notched, as indicated at 45, to prevent the shield 31 and its associated pivot pin 33 from interfering with full opening movement of the upper section.

When the appliance is opened, either to the partially opened position shown in Fig. 4 or to the fully operated position shown in Fig. 6, the guards 38 and 39 co-operate to protect and conceal the cable 27.

We claim as our invention:

1. In a cooking appliance having relatively movable upper and lower sections provided with opposed cooking surfaces, a pair of spaced, vertical ears on said lower section, a pair of spaced vertical ears on said upper section overlapping the ears of the lower section, a horizontal pivot bolt extending through both pairs of ears, the ears on one of said sections being provided with vertical slots receiving said pivot bolt, upper and lower shields, one edge of said upper shield being pivotally attached to said upper section on an axis parallel to that of said pivot bolt and extending outwardly above and beyond said bolt, said lower shield being pivotally connected at its upper edge to the outer edge of said upper shield and extending downwardly therefrom in spaced relation to and below said pivot bolt, means interconnecting the lower edge of said lower shield with the ears on the lower section for pivotal and limited vertical movement, and an electrical cable extending from said lower section to said upper section around said pivot bolt and between it and said shields.

2. The invention set forth in claim 1 with the addition that said shields extend between said ears when the upper section is resting on the lower section, the outer surfaces of the shields being substantially flush with the edges of said ears.

3. The invention set forth in claim 1 with the addition that the means interconnecting the lower shield with the ears of the lower section comprises a pin projecting beyond the ends of said lower shield, the ears on the lower section being provided with generally vertical slots slidably receiving the ends of said pin.

4. In a cooking appliance having relatively movable upper and lower sections provided with opposed cooking surfaces, a pair of spaced, vertical ears on said lower section, a pair of spaced vertical ears on said upper section overlapping the ears of the lower section, a horizontal pivot bolt extending through both pairs of ears, an upper shield pivotally connected to the upper section and extending therefrom above said pivot bolt, a lower shield pivotally connected to the outer edge of said upper shield and extending downwardly therefrom, means pivotally connecting the lower edge of said lower shield with the ears on said lower section, and flexible electrical conducting means extending to said upper section between said pivot bolt and said shields.

5. In a cooking appliance having relatively movable upper and lower sections provided with opposed cooking surfaces, means interconnecting said sections for relative swinging movement, flexible electrical connecting means extending betwen said sections adjacent said interconnecting means, and means for protecting said connecting means, said protecting means comprising a pair of elongated, sheet-metal shields each having parallel longitudinal edges, means pivotally interconnecting one of said shields along one of its longitudinal edges with the upper section of the appliance, means pivotally interconnecting the other of said shields along one of its longitudinal edges with the lower section of the appliance, and means pivotally interconnecting the two shields along their remaining longitudinal edges.

6. The invention set forth in claim 4 with the addition that said sections are provided respectively with guards between said ears and from the rear edges of the section to points adjacent said pivot bolt.

7. In a cooking appliance having relatively movable upper and lower sections provided with opposed cooking surfaces, spaced ears extending rearwardly from said sections into overlapping relationship, a pivot bolt extending through said ears to interconnect said sections for relative swinging movement, a guard extending between the ears of the lower section and rearwardly therefrom to a point beneath said pivot bolt, a second guard extending between the ears of the upper section and rearwardly therefrom to a point adjacent said pivot bolt and above said first guard, and an electrical conductor extending between said upper and lower sections and around the pivot bolt and the rear edges of said guards, said upper and lower sections being movable about the axis of said pivot bolt between a position in which their cooking surfaces are opposed and a position in which such cooking surfaces are generally co-planar, said guards projecting far enough from their respectively associated sections to overlap when said sections are in the last named position.

EDWARD A. FARR.
JOHN P. THEISEN.

REFERENCES CITED

The following references are of record in the file of this patent:

UNITED STATES PATENTS

| Number | Name | Date |
| --- | --- | --- |
| 1,754,800 | Preston | Apr. 15, 1930 |
| 2,015,812 | Nelson | Oct. 1, 1935 |
| 2,267,387 | Windborne | Dec. 23, 1941 |

FOREIGN PATENTS

| Number | Country | Date |
| --- | --- | --- |
| 550,351 | Germany | May 11, 1932 |